US006953008B1

(12) United States Patent
Remmler

(10) Patent No.: US 6,953,008 B1
(45) Date of Patent: Oct. 11, 2005

(54) ANIMAL SURGICAL TRAY

(76) Inventor: Thomas Remmler, 2145 Edgewood Dr., Sedona, AZ (US) 86336

( * ) Notice: Subject to any disclaimer, the term of this patent is extended or adjusted under 35 U.S.C. 154(b) by 234 days.

(21) Appl. No.: 10/646,479

(22) Filed: Aug. 23, 2003

Related U.S. Application Data

(63) Continuation-in-part of application No. 10/052,610, filed on Jan. 23, 2002, now Pat. No. 6,675,741.

(51) Int. Cl.[7] ............................................... A01K 15/04
(52) U.S. Cl. .......................... 119/757; 5/628; 128/846; 128/870
(58) Field of Search ................................ 128/845, 846, 128/869, 870, 872, 89 R; 119/757, 753, 725–727, 755; 5/628, 731, 740; 602/26

(56) References Cited

U.S. PATENT DOCUMENTS 3,717,128 A * 2/1973 Pearman et al. ............ 119/757
4,030,719 A 6/1977 Gabriele
4,184,451 A * 1/1980 Carlin ........................ 119/755
4,301,791 A * 11/1981 Franco, III ................... 602/19
4,949,713 A * 8/1990 Mykietiuch .................... 602/5
5,431,623 A * 7/1995 Rice ............................ 602/26
5,619,747 A * 4/1997 Boisclair et al. ............... 2/465
5,709,648 A * 1/1998 Webb .......................... 602/19
5,725,486 A * 3/1998 Engelman ...................... 602/5
5,742,963 A * 4/1998 Trevino et al. ................ 5/632
5,915,334 A * 6/1999 Cummings et al. ......... 119/723
5,925,005 A * 7/1999 May .............................. 602/6
6,067,678 A * 5/2000 Trevino ......................... 5/628
6,138,306 A * 10/2000 Muhanna ....................... 5/706
6,443,918 B1 * 9/2002 Wang ............................ 602/5
6,675,741 B2 * 1/2004 Remmler .................... 119/755

FOREIGN PATENT DOCUMENTS

DE 3717128 A1 * 12/1988 ........... F16K/47/02
DE 4030719 A1 * 4/1991 ............. B60T/1/00

* cited by examiner

*Primary Examiner*—Peter M. Poon
*Assistant Examiner*—Bethany L. Griles
(74) *Attorney, Agent, or Firm*—LaValle D. Ptak

(57) ABSTRACT

A surgical tray for holding an animal in place in a dorsally recumbent position is made in the form of a shell contoured to conform generally to the back, neck and head of the animal. The shell has raised side wall portions on it in the vicinity of the head and thorax area, and scapular shoulder rests for the animal. Openings are placed adjacent the positions of the front and rear legs of an animal placed in the shell; and a detachable leg strap is led around the leg of an animal and passes through a corresponding opening in the shell for holding the animal in place. The shell is designed to raise the bottom above a table surface on which it is placed; and drain holes through the shell are employed to drain fluids from it.

17 Claims, 8 Drawing Sheets

ANIMAL SURGICAL TRAY

RELATED APPLICATION

This application is a continuation-in-part of application Ser. No. 10/052,610 filed on Jan. 23, 2002 now U.S. Pat. No. 6,675,741.

TECHNICAL FIELD

This invention is concerned with small animal restraint systems.

BACKGROUND

Small animals need to be restrained, i.e., kept still, during radiographic, ultrasound and surgical procedures. In many veterinary hospitals, a veterinarian's assistant is required to hold and position the animal even though it is anesthetized. In radiographic pictures, this can subject the assistant to potentially dangerous X-rays.

It has, therefore, been proposed to provide some sort of mechanical restraint device to hold the animal still during the procedure. Several such devices are disclosed in the U.S. Pat. No. 4,184,451 granted to M. O. Carlin Jan. 22, 1980 for "Restraining Device for Animal Surgery". The devices there disclosed, however, can only support the animal in supine position permitting only ventro-dorsal radiographic views. The devices of Carlin are such that an animal placed on them rests directly on top of the Carlin frame or shell forming a support platform. Straps are located to attempt to hold the animal in a stationary position on top of the platform. These straps are somewhat cumbersome to use; and the configuration of the Carlin devices are such that the device cannot be turned over on its side. The same is true of a similarly designed child restraint device disclosed in U.S. Pat. No. 4,030,719 granted Jun. 21, 1977 to W. J. Gabriele et al. for "Child Immobilizing Device for X-rays".

The Engleman U.S. Pat. No. 5,725,486 is directed to an orthotic leg elevator through which straps pass from one side to the other for subsequent encircling of and attachment around the leg of a person using the leg elevator. The openings for the straps of Engleman are located on opposite sides of the elevator; and the device is not designed either for radiographic procedures or as a surgical platform.

There continues to be a need for a more versatile restraint system and surgical tray.

SUMMARY OF THE INVENTION

It is an object of this invention to provide an improved surgical tray.

It is another object of this invention to provide an improved surgical tray for animals.

It is an additional object of this invention to provide an improved surgical tray for small animals to hold the animal in a dorsally recumbent position for surgery.

It is a further object of this invention to provide an improved animal surgical tray for holding an animal in place in a dorsally recumbent position for insulating the animal from the operating table surface, and providing drainage of fluids from the surgical tray.

In accordance with a preferred embodiment of the invention, an animal surgical tray holds an animal in place in a dorsally recumbent position. The tray is formed from a shell of material having a base contoured to conform generally to the back, neck and head regions of an animal. Opposite sides are formed by raised side wall portions extending above the base in the vicinity of the head and thorax area of an animal placed in the surgical tray. The raised side wall portions form a generally U-shaped cross-sectional configuration with the base of the shell, with scapular shoulder rests for the animal and openings adjacent the positions of the front and rear legs of the animal placed in the shell. The bottom of the shell is raised above the table surface on which the shell is placed; and at least one drain hole is placed through the shell to drain fluids from it. A plurality of detachable leg straps for positioning and holding the legs of an animal are provided, where each detachable leg strap is led around the leg of an animal and then passes through a corresponding one of the openings in the shell.

DETAILED DESCRIPTION

Figure 1:
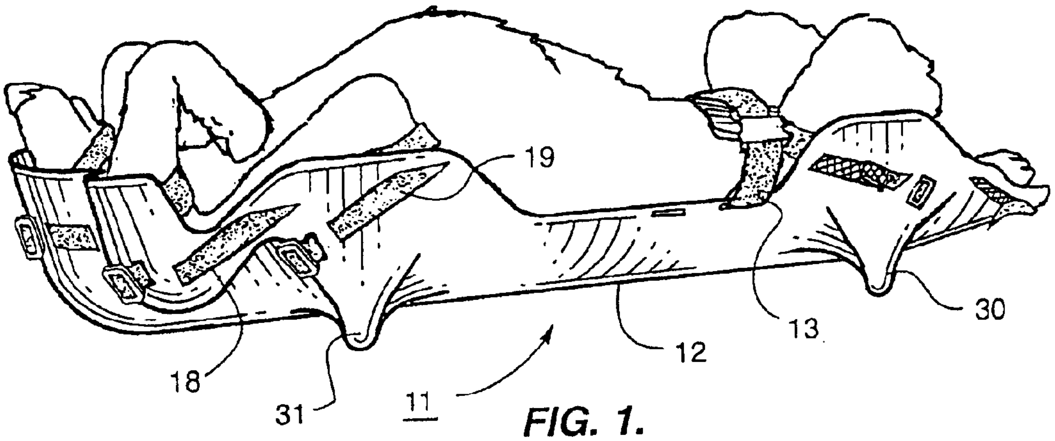
FIG. 1 is a side elevational view of the restraint system with the animal therein on its back.
Figure 2:
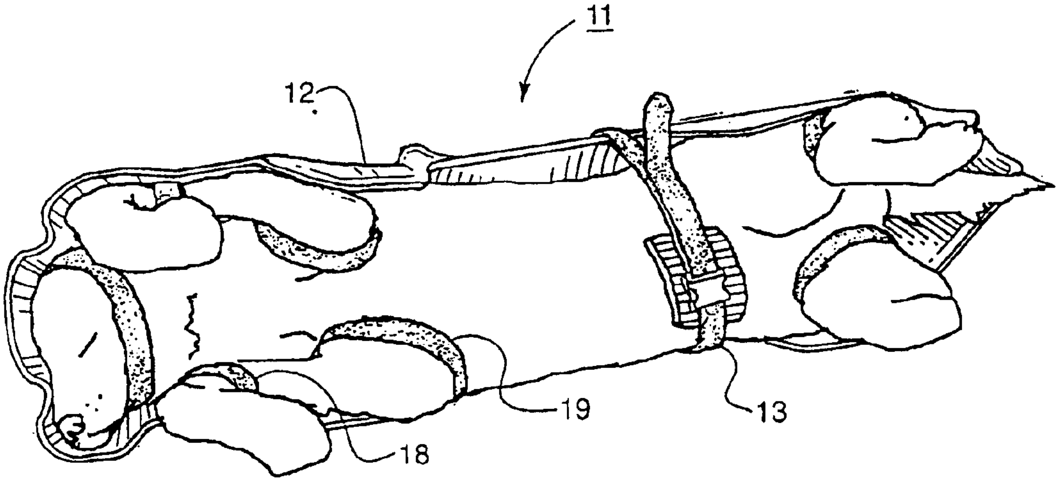
FIG. 2 is a side elevational view of the restraint system with the system and the animal therein on its side.
Figure 3:
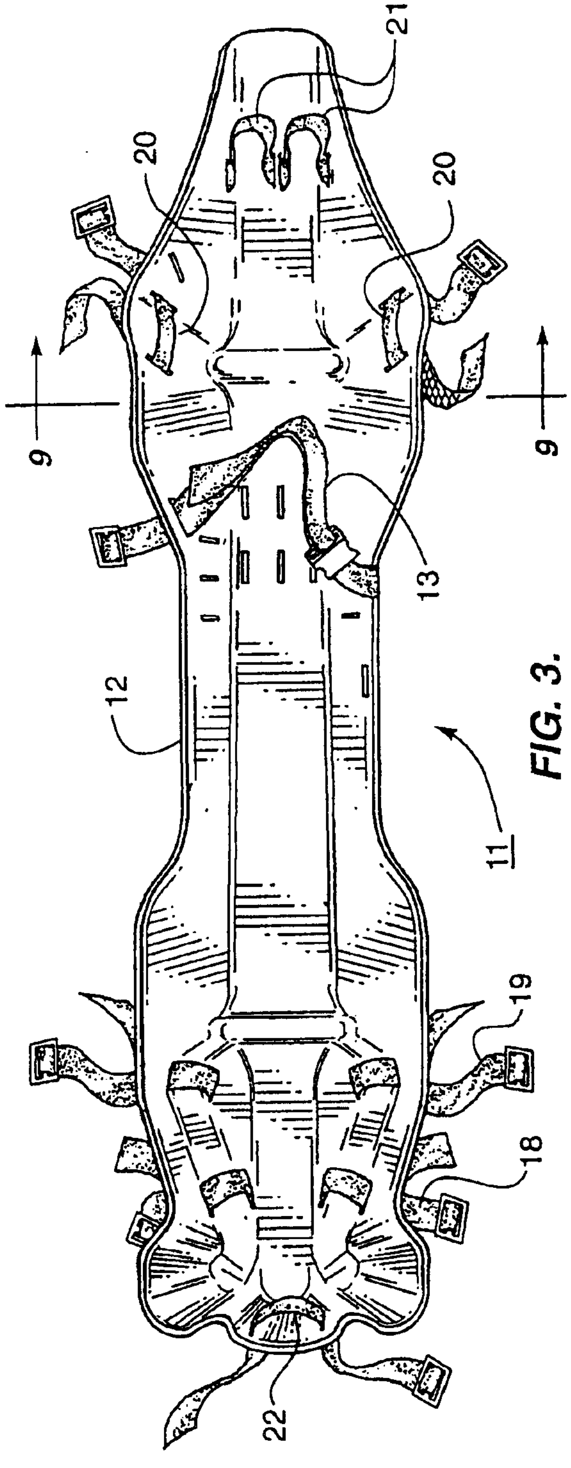
FIG. 3 is a plan view of the restraint system.
Figure 4:
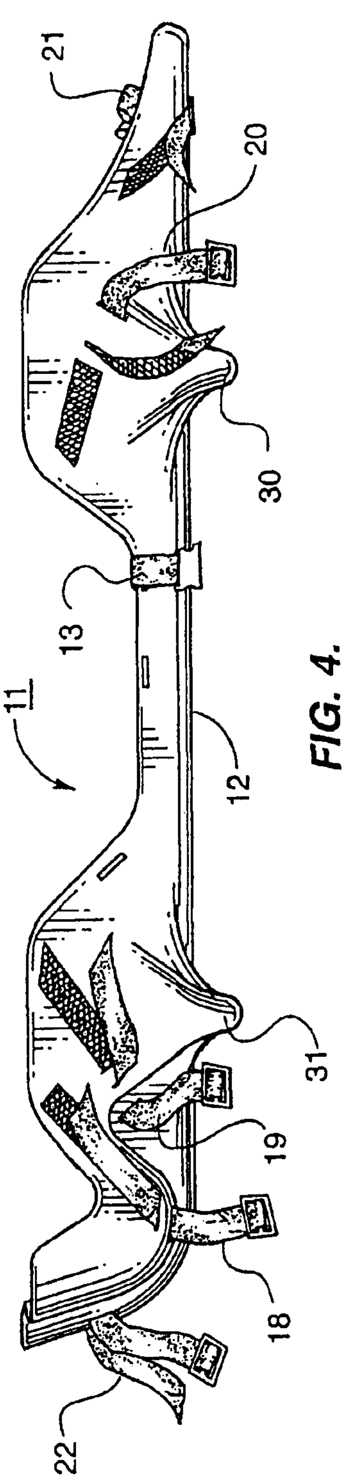
FIG. 4 is a side elevational view of the restraint system.
Figure 5:
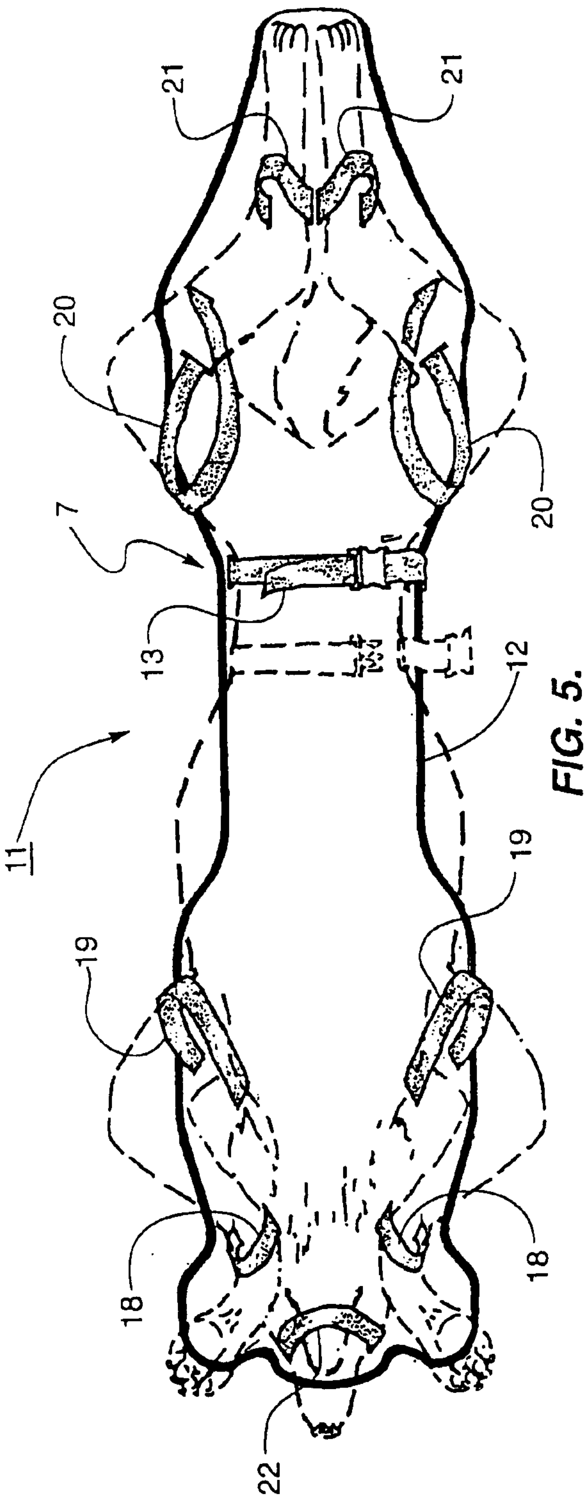
FIG. 5 is a plan view of the restraint system with an animal in phantom to show placement of the restraint straps.
Figure 6:
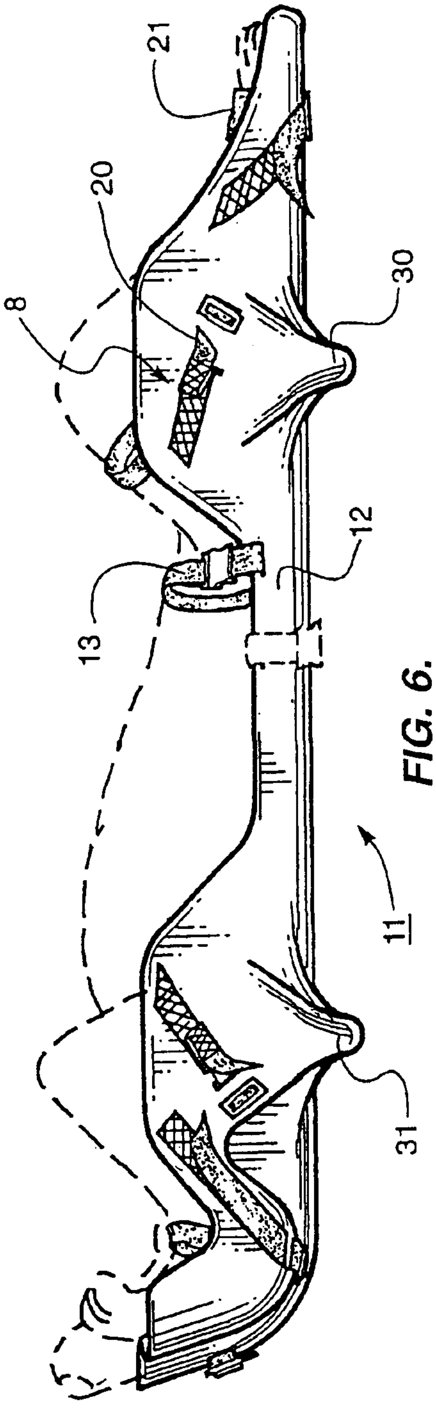
FIG. 6 is a side elevational view of the restraint system with an animal in phantom to illustrate placement of the restraint straps.

In FIGS. 1 and 2, the restraint system of the invention is designated generally by reference numeral 11. With the restraint system positioned as shown in FIG. 1 with the animal on its back, the animal is positioned as it might be for surgery, for ultrasonography or radiography for ventro-dorsal views. The restraint system can also be placed on its side to position the animal on its side where left or right lateral radiography views can be taken.

Details of construction of the restraint system 11 are better illustrated in FIGS. 3 through 10. The system includes a shell 12 shaped to conform generally to the back, neck and head region of an animal to be restrained. The shell 12 is preferably thermo-formed from plastic sheet material, such as polyethylene, which is radiolucent. The shell 12 also can be rotomolded or injection molded of similar materials.

Figures 7, 8, 9, 10:
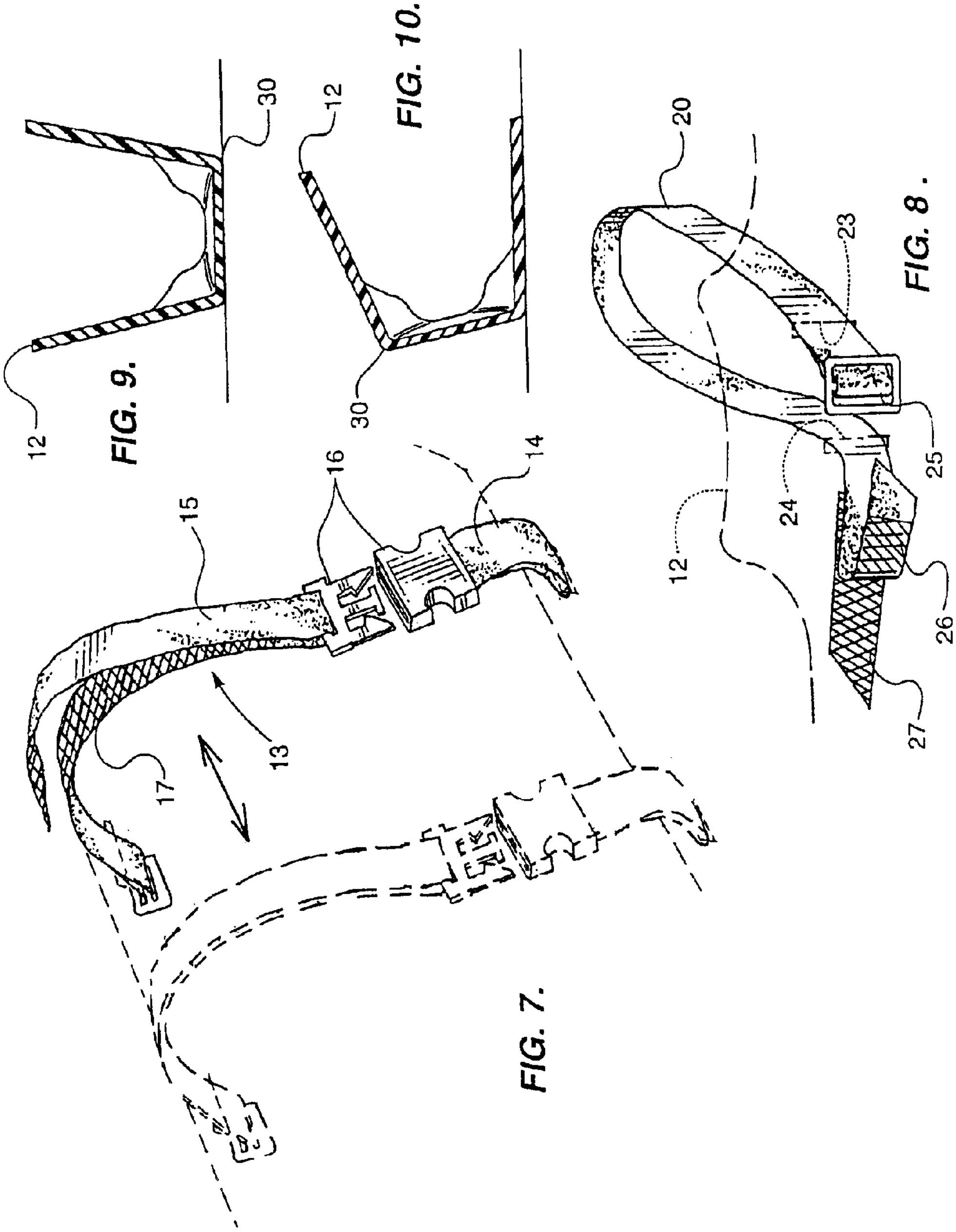
FIG. 7 is a fragmentary perspective view of the torso straps employed in the restraint system.
FIG. 8 is a fragmentary perspective view of a restraint strap with its fastener.
FIG. 9 is a sectional view through the shell of the restraint system taken as indicated by line 9—9 in FIG. 3.
FIG. 10 is a sectional view like FIG. 9, but showing the shell placed on its side.

The restraint system 11 further comprises a torso strap 13 preferably positioned n the shell to go across the abdominal region of the animal. The torso strap 13 preferably is positioned on the shell to go across the abdominal region of the animal. The torso strap 13 preferably comprises two sections 14 and 15 joined by a separable buckle 16. Adjustment of the length of torso strap 13 is provided by doubling back strap section 15 on itself with separable hook and loop strips (see FIG. 7). Also as indicated in FIG. 7, attachment of torso strap 13 is such as to permit the strap to affixed in different positions along the body of the animal. Torso strap 13 is made of a radiolucent fabric and its buckle is made of a radiolucent plastic material.

The restraint system 11 of this invention is designed to position the legs of the animal out of the way of the torso to provide for optimal radiological viewing of the abdominal and thoracic fields. To this end, the restraint system 11 includes a plurality of leg straps. For each of the front legs, there is provided a carpal strap 18 and a humeral strap 19. For each of the rear legs there are provided a femoral strap 20 and a tarsal strap 21. There also is preferably provided a muzzle strap 22 for holding the head of the animal still.

Each of the leg straps 18 through 21 and the muzzle strap 22 are constructed and assembled to the shell 12 in the manner of the femoral strap 20 illustrated in FIG. 8. The strap 20 enters a opening 23 in the wall of the shell 12, goes around the animal body part and exits a nearby opening 24 in the shell. The stationary end of the strap 20 has affixed thereto a plastic anchor 25 which abuts the outer surface of the shell. The lead portion of the strap 21 has one portion 26 of a hook and loop fastener thereon which mates with the other portion 27 of the fastener which is carried by the outer surface of the shell. It is thus possible to pull the straps snugly around the animal body part and lock it in place with the hook and loop fastener. It should be noted that the side walls of the shell n the vicinity of the legs of the animal are raised to accommodate the straps.

At least one and preferably two sections 30 and 31 of the shell intermediate its ends have a generally U-shaped configuration, as shown in FIGS. 9 and 10, permitting the shell to rest with the animal supine or on its side. These section are preferably in the regions of the shell where the side walls are raised, as this ensures stability of the restraint system with the animal is positioned on its side. The upright regions of sections 30 and 31 are preferably at slightly more than a 90° angle to the base regions to compensate for the tendency of the body of the animal to sag when placed on its side.

Reference now should be made to FIGS. 11 through 15, which show a variation of the restraint system of FIGS. 1 through 10 in the form of a surgical tray. The surgical tray of FIGS. 11 through 15 is designed for holding in place a dorsally recumbent, anesthetized animal for surgery. The tray holds the animal symmetrically in place and includes a main body portion 50 having a generally flat base, and which has low upturned sides extending generally from the shoulder area of the animal to the end where the back legs are supported.

Figure 12:
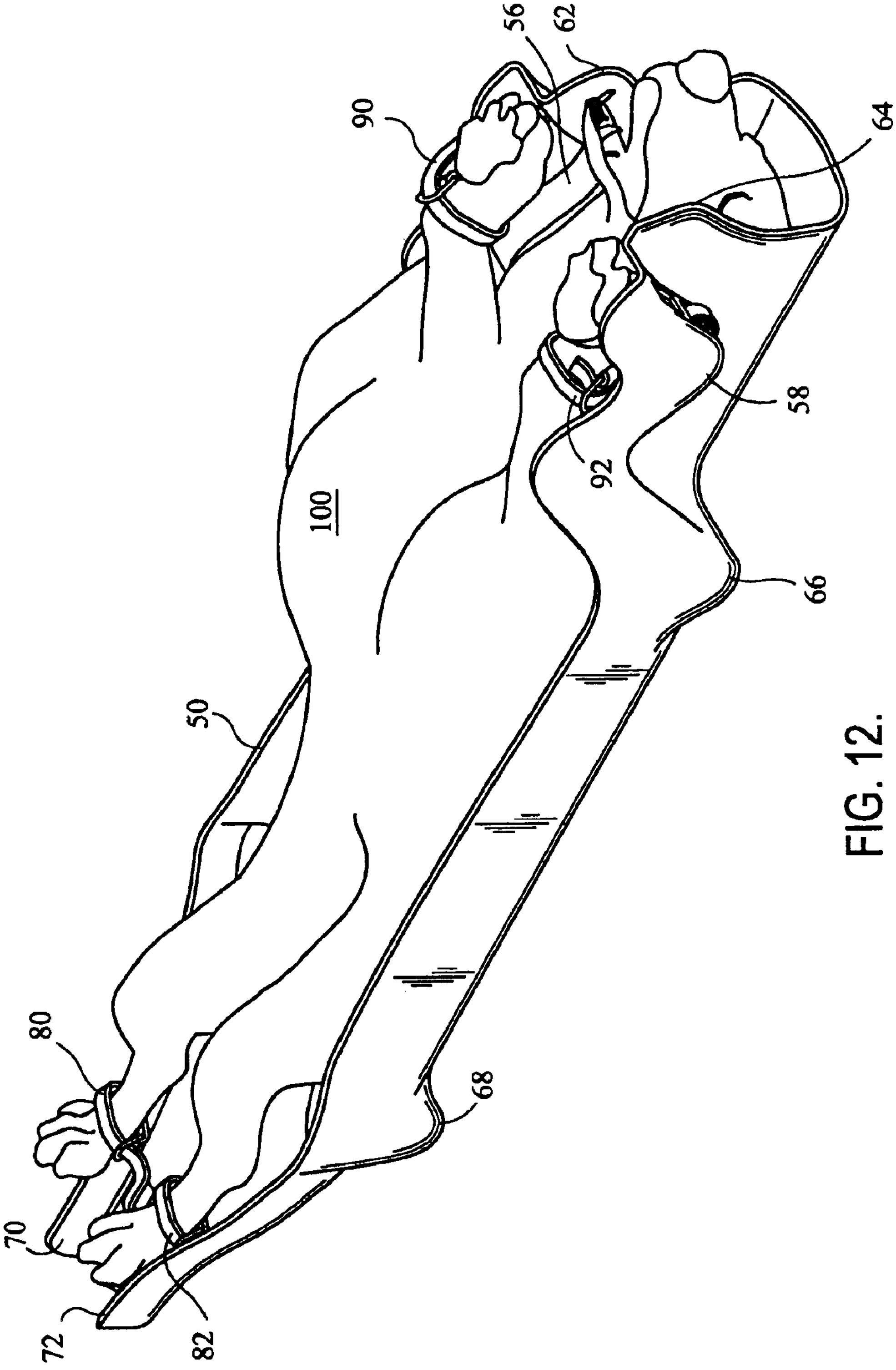
FIG. 12 is a view similar to FIG. 11, with an animal in the surgical tray.
Figure 13:
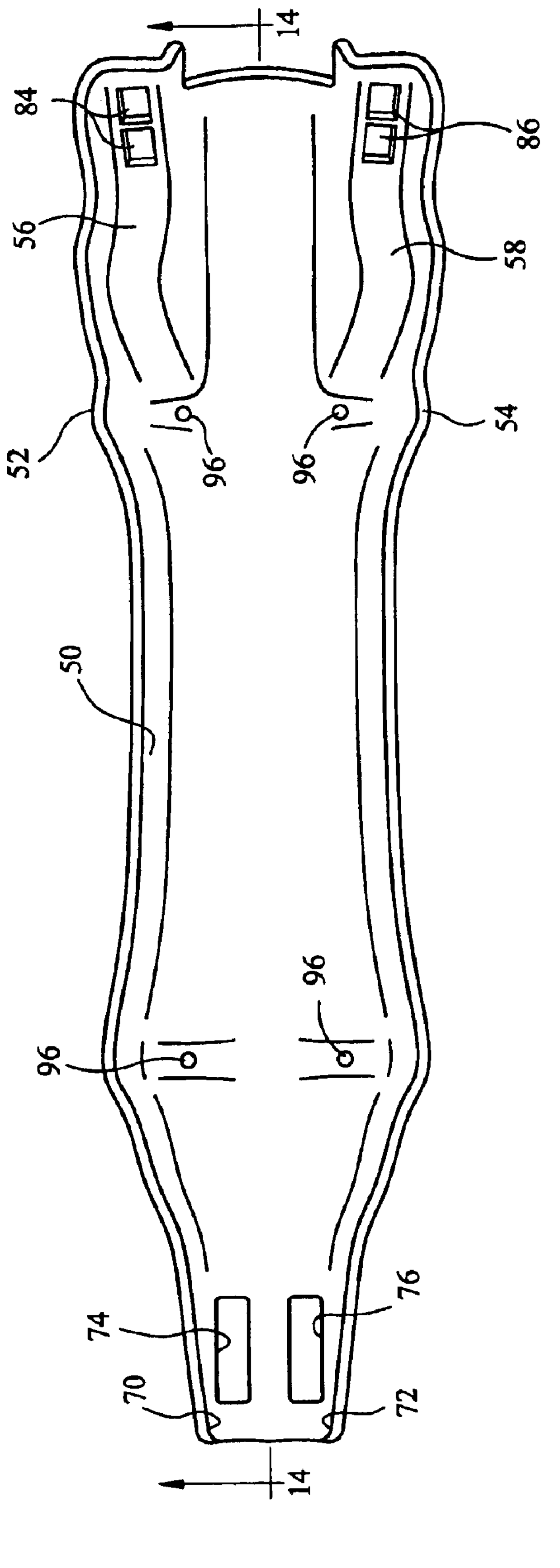
FIG. 13 is a top view of the embodiment of FIG. 11.
Figure 14:
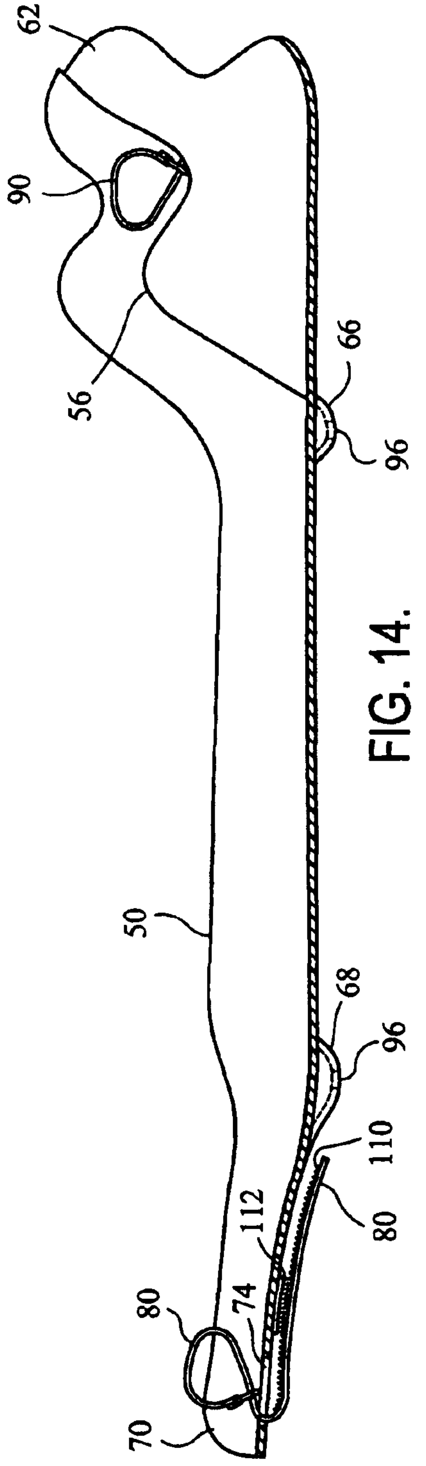
FIG. 14 is a longitudinal cross-sectional view of the embodiment of FIG. 11.

As is most readily apparent from an examination or comparison of FIGS. 14 and FIG. 6, for example, it can be seen that the embodiment of FIGS. 11 through 15 does not include the relatively high raised portion at the rear of the animal which is present in the embodiment described above in conjunction with FIG. 1 through 10. The surgical tray 50 terminates in a narrowed region, with slightly upturned sides 70 and 72 at the portion designed to underlie the legs of the animal. The other end, the end which is designed to underlie the head of the animal 100, comprises raised side portions 50 and 54 and a head support region 60 with upstanding sides 62 and 64 for accommodating the head and thorax area of an animal. In addition, scapular shoulder rests 56 and 58 are formed in the tray for supporting the shoulders and front legs of the animal 100 in the manner illustrated in FIG. 12.

The main body or shell 50 of the surgical tray is supported at the front by shoulders 66, which are comparable to the section 31 of the embodiment of FIGS. 1 to 10, and at the rear by shoulders 68, which are comparable to the sections 30 of the embodiment of FIGS. 1 through 10. As is most readily apparent from an examination of the side views of FIGS. 14 and 15, these shoulders 66 and 68 are designed to be placed on the top of a stainless steel operating table or the like, and elevate the bottom of the surgical tray 50 up off the table to provide good heat insulation between an animal 100 placed on the surgical tray and the top of the surgical table (not shown).

An additional feature which is shown most clearly in FIG. 13 is the provision of apertures or holes 96 in the region of the shoulders 66 and 68 in the bottom of the shell 50 to allow the drainage of fluids which may occur during surgery to take place out of the bottom of the shell 50, through the holes 96 and onto the surface of the operating table. Thus, fluids are constantly drained away during surgery. The holes 96 are shown in a particular orientation and relationship with the shoulders or extensions 66 and 68; but it should be noted that if the bottom of the shell 50 is configured differently from the one which is illustrated in FIGS. 11 through 15, a hole or plurality of holes such as the holes 96 should be provided in the lowest portion of the shell 50 to facilitate the drainage of fluids away from an animal 100 placed in the surgical tray.

Figure 15:
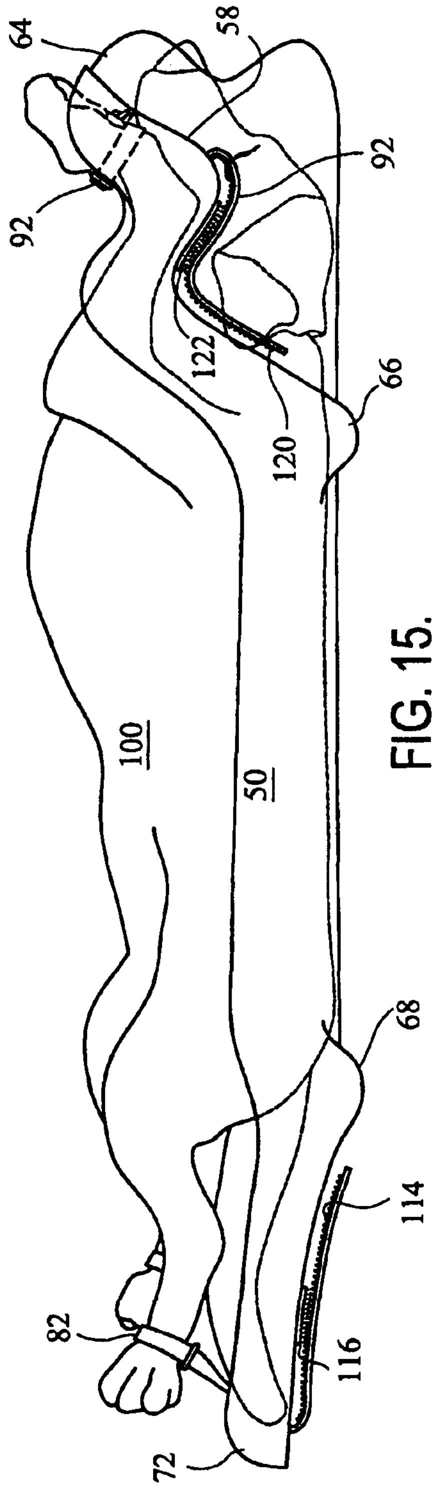
FIG. 15 is a side view of the embodiment of FIG. 11 with an animal in place.

As shown in FIGS. 12 and 15, an animal 100, such as a dog or the like, is placed in a dorsally recumbent position with the head between upturned portions 62 and 64, and with the front legs resting on the raised areas 56 and 58. As illustrated most clearly in FIG. 13, two spaced elongated apertures 74 and 76 are located at the read end of the shell 50; and two pairs of apertures 84 and 86 are located in the raised portions 56 and 58 to accommodate leg straps for holding the animal in place during surgery.

Since the surgical tray of FIGS. 11 through 15 is designed to be used with a fully anesthetized animal, the number of restraining straps required to hold the animal in place is reduced from the number required for restraining an animal in the embodiment shown in FIGS. 1 through 10. That embodiment is capable of use and generally is used for animals who are not fully anesthetized. For that reason, greater numbers of restraining straps are required.

Figure 11:
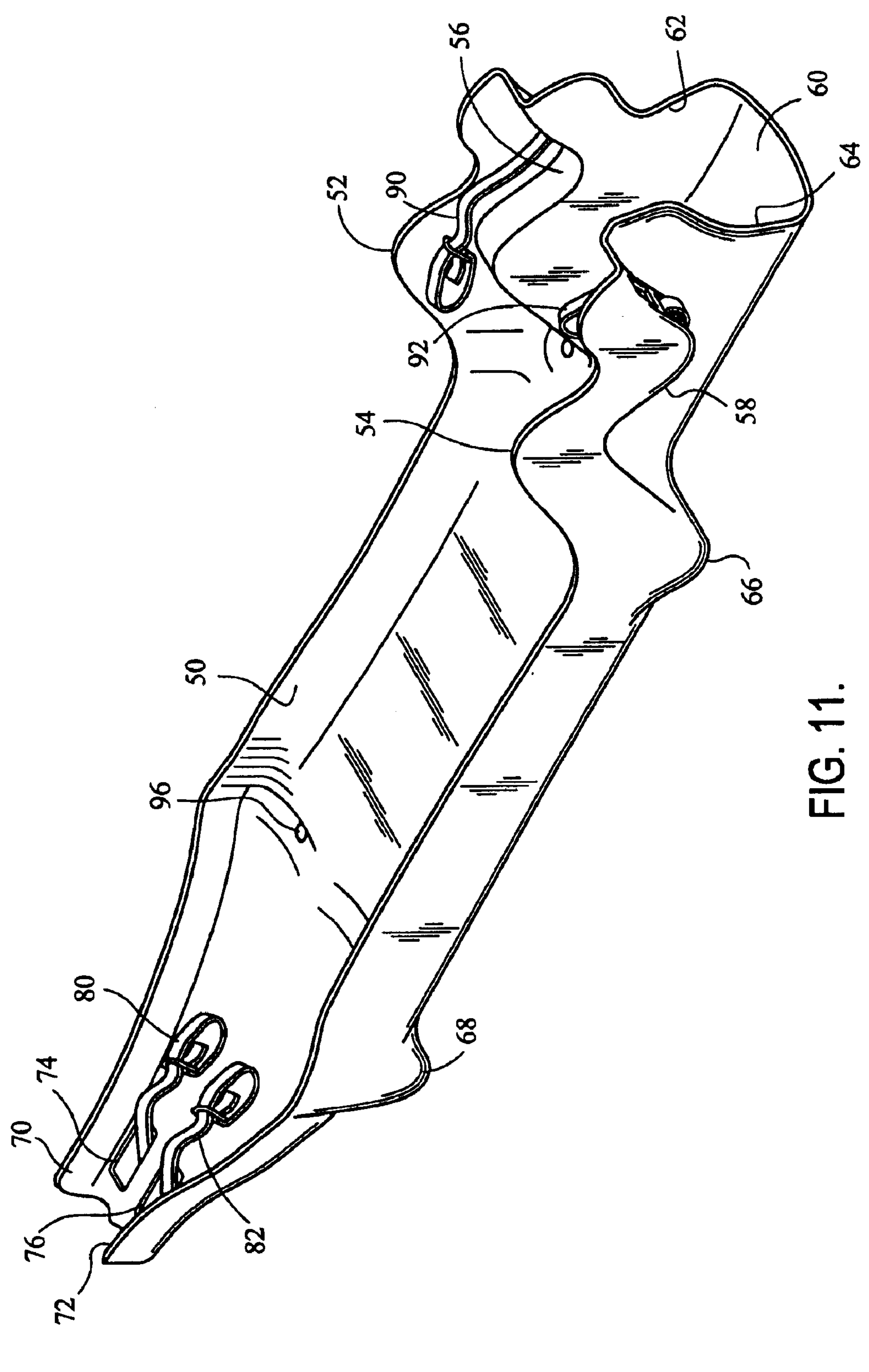
FIG. 11 is a top perspective view of an alternative embodiment in the form of a surgical tray.

In the embodiment shown in FIGS. 11 and 12, a restraining strap for each of the front legs of the animal is provided in the form of straps of the type shown in conjunction with FIGS. 1 through 10, or in the form illustrated in FIGS. 14 and 15. The straps 90 and 92 are carpal straps for each of the front legs; and they are designed to exit through a respective opening or aperture 84 or 86 to be secured by means of a hook and loop fastener, such as the fastener portions 120/122 illustrated in FIG. 15. The portion 122 is secured to the outside of the shell; and the portion 120 is secured to the strap itself. By utilizing this type of fastener rapid attachment and securing of the restraining straps 90 and 92 is effectively accomplished.

It should be noted in the embodiment shown in FIGS. 12, 14 and 15, the strap 90 is provided with a buckle 92 at one end; so that the strap itself is passed through the buckle or loop 92 after placement around the leg of the animal before the free end is secured by means of the Velcro® fasteners 120/122 on the outside of the surgical tray. A strap arrangement of the type illustrated in conjunction with the leg straps in the embodiment of FIGS. 1 through 12, also could be used in conjunction with the embodiment shown in FIGS. 11 through 15.

The rear legs of the animal 100 are similarly held in place by means of straps 80 and 82, which may be in the form of a tarsal strap looped around the leg of the animal and then passed through a buckle or loop back through the corresponding apertures 74 and 76 to be secured to the outside of the tray by means of hook and loop fasteners, such as the fastener 100/112 or 114/116, as illustrated in FIGS. 14 and 15, respectively. Once again it should be noted that the portions 112 and 116 are secured permanently to the outside of the shell 50 of the surgical tray; and the portions 110 and 114 are secured to one side of the appropriate straps 80 and 82.

By providing little or no upturned edges to the shell 50 of the surgical tray in the region of the hips and back legs of the animal 100, it is possible to allow the hips to spread outwardly over the edges of the tray 50 to facilitate the surgeon in any surgical procedure which is to take place while the animal is in the position shown in FIGS. 12 and 15. At the same time, the raised sides on the front of the tray, in the regions 52, 54, and 62, 64 provide good support for the animal and assist in holding the animal 100 in a properly oriented dorsal-ventral position for surgery.

It also should be noted that surgical trays of different sizes or in a number of different size ranges are provided to accommodate animals from small sizes, such as a cat, to large sizes, such as large dogs and the like. In addition to the features described above, particularly for surgical trays used for large sized animals, handles, either in the form of enlarged upper ones of the opening pairs 84 and 86 and the openings 74 and 76, or handles otherwise externally applied to the shell 50 may be employed to allow use of the surgical tray as a stretcher for conveying an animal from one place to another.

A significant advantage of such a dual use surgical tray is that an animal may be anesthetized and placed in the tray in one location, then transported, using the tray as a stretcher, to the surgery location, and then following surgery, back to a recovery location without requiring movement of the animal from a stretcher to the surgical table and then back again to a stretcher.

Typically, the surgical tray 50 is made of a plastic material, and ideally is made of radiolucent material; so that it also can be used in obtaining X-rays in the same manner described previously in conjunction with the device described above and shown in FIGS. 1 through 10. Because the surgical tray of FIGS. 11 through 15 is designed to be used with fully anesthetized animals, only four leg straps, as illustrated, are required to hold the animal in place during surgery.

The foregoing description of the preferred embodiments of the invention is to be considered as illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. A surgical tray in which an animal is held in place in a dorsally recumbent position, the surgical tray including in combination:

a shell having a base contoured to conform generally to the back, neck and head regions of an animal, the shell further having opposite sides formed by raised side wall portions extending above the base in the vicinity of the head and thorax area of an animal placed in the surgical tray, the raised side wall portions forming a generally U-shaped cross-sectional configuration with the base of the shell, with scapular shoulder rests for an animal and openings adjacent the front and rear leg positions of an animal placed in the shell;

means to raise the base of the shell above a table surface upon which it is placed; and a plurality of detachable leg straps for positioning and holding the legs of an animal, wherein each detachable leg strap is led around the leg of an animal and passed through a corresponding one of the openings in the shell.

2. A surgical tray according to claim 1 wherein the means to raise the shell above a table surface comprise projections extending from the bottom of the shell and unitarily formed with it.

3. A surgical tray according to claim 1 wherein the shell has at least one drain hole therethrough.

4. The animal surgical tray according to claim 1 wherein there is a detachable leg strap for each of the four legs of an animal.

5. The animal surgical tray according to claim 1 wherein the raised side wall portions forming the generally U-shaped cross-sectional configuration with the base of the shell is in the form of a "U" having diverging sides extending from the bight of the "U".

6. A surgical tray according to claim 1 further including means on the exterior of the shell for releasably securing each detachable leg strap against movement.

7. A surgical tray according to claim 6 wherein the means for releasably securing the leg straps includes hook and loop fastener members.

8. The surgical tray according to claim 1 wherein the shell is formed of a radiolucent material.

9. A surgical tray according to claim 8 further including means on the exterior of the shell for releasably securing each detachable leg strap against movement.

10. A surgical tray according to claim 9 wherein the means for releasably securing the leg straps includes hook and loop fastener members.

11. A surgical tray according to claim 9 wherein the means to raise the shell above a table surface comprise projections extending from the bottom of the shell and unitarily formed with it.

12. The animal surgical tray according to claim 11 wherein there is a detachable leg strap for each of the four legs of an animal.

13. A surgical tray according to claim 12 wherein the shell has a plurality of drain holes therethrough.

14. The animal surgical tray according to claim 2 wherein there is a detachable leg strap for each of the four legs of an animal.

15. A surgical tray according to claim 14 wherein the shell has a plurality of drain holes therethrough.

16. A surgical tray according to claim 15 further including means on the exterior of the shell for releasably securing each detachable leg strap against movement.

17. A surgical tray according to claim 16 wherein the means for releasably securing the leg straps includes hook and loop fastener members.

* * * * *